United States Patent [19]

Minowa et al.

[11] 4,156,904
[45] May 29, 1979

[54] COMPUTER SYSTEMS HAVING A COMMON MEMORY SHARED BETWEEN A CENTRAL PROCESSOR AND A CRT DISPLAY

[75] Inventors: Yasuo Minowa, Higashimurayama; Toshitaka Hara; Nagaharu Hamada, both of Hitachi, all of Japan

[73] Assignee: Hitachi, Ltd., Japan

[21] Appl. No.: 827,112

[22] Filed: Aug. 23, 1977

[30] Foreign Application Priority Data

Aug. 25, 1976 [JP] Japan .............................. 51-100528

[51] Int. Cl.² .......................... G06F 13/00; G06F 3/14
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,214,739 | 10/1965 | Gountanis | 364/200 |
| 3,534,338 | 10/1970 | Christensen | 364/200 |
| 3,828,319 | 8/1974 | Owen | 364/200 |
| 3,934,232 | 1/1976 | Curley | 364/200 |

Primary Examiner—James D. Thomas
Attorney, Agent, or Firm—Craig & Antonelli

[57] ABSTRACT

A computer system comprises a central processor unit, a single memory apparatus and an external processor unit which is adapted to read out N bytes of data in each period of $T_o$. The number n of data remaining to be processed after a time elapse $T_1$ ($T_1 < T_o$) from the beginning of the period $T_o$ is successively compared with the number m of data which can be read out continuously by the external processor unit during a remaining time span ($T_o-T_1$). So long as the number n is smaller than the number m the external processor unit is allowed to read out the data from the memory apparatus only when the central processor unit is not using the memory apparatus. On the other hand, when the number n becomes equal to the number m, connection between the memory apparatus and the central unit is interrupted to allow in turn the external processor unit to read out data from the memory apparatus, whereby the processing efficiency of the computer system is improved.

5 Claims, 5 Drawing Figures

COMPUTER SYSTEMS HAVING A COMMON MEMORY SHARED BETWEEN A CENTRAL PROCESSOR AND A CRT DISPLAY

BACKGROUND OF THE INVENTION

The present invention relates to a computer system in which a single memory apparatus is shared between a central processor unit and an external processor units for common use thereof, the external processor unit being adapted to read out predetermined bytes of data from the memory apparatus periodically within a predetermined period of time.

In such a computer system, a CRT (cathode ray tube) display apparatus may be employed as the external data processor unit. In such a case, a pattern is repeatedly displayed with a frame frequency of 50 cycles/sec. in consideration of phosphor decay time and flickers of the pattern of frame. Under these conditions, for a CRT display apparatus capable of displaying 24 lines, each line consisting of 80 characters, i.e. 1920 characters in total, it is required that 80 bytes of data for one line display (one byte of data corresponds to one character) have to be read out from the memory apparatus within a period of about 800μ sec. Usually, a CRT display apparatus includes a buffer memory of a capacity to store data for one line. The data read out from the memory apparatus are stored temporarily in this buffer memory and displayed as one character line on the CRT after having been converted into a cooresponding character pattern. When a time span of 800μ sec. corresponding to a time duration for one line display has elapsed after the storage of the character data in the buffer memory, it then becomes necessary to write in the buffer memory new data of 80 bytes in the time span of 80μ sec. (corresponding to a duration of a single scanning line) for preparation of display of a succeeding line. In this connection, it is noted that the memory apparatus may not have accesses simultaneously from both the central processor unit and the CRT display apparatus for the read-out or write-in of data. Consequently, in the case of a known computer system in which the central processor unit is allotted with preference or priority for use of the memory apparatus, there may arise a possibility that a required number of data can not be read out by the CRT display apparatus, eventually resulting in occurrence of flickers and generation of somber patterns. In another type of the known computer system, use of the memory apparatus by the central processor unit has to be interrupted with undesirable frequency.

An attempt to eliminate the drawbacks described above is disclosed in Japanese Laying-Open of Patent Application No. 50-110233 (1975) "Control System for Display Apparatus." This patent application relates to a control system for use in the case where a display apparatus is connected to a data processing apparatus of a stored program type. In particular, there is a discription about an embodiment shown in FIG. 3, right lower column, lines 9 to 17, page 2 of the specification of the above-mentioned Japanese Patent Application. According to the description, an arrangement is made such that data transfers between a memory apparatus 5 and a program processor 10, on one hand, and between the memory 5 and a DMA (Direct Memory Access) control 11, on the other hand, are performed alternatively for every memory cycle. With such an arrangement, the program processing can be executed independently from the DMA control, whereby the data transfer to the DMA control can be carried out without fail for every memory cycle. Thus, even when the program processor enters into processing of a length command, there will not arise such a case in which the data transfer to the DMA control 11 is interrupted for a long duration. In this way, DMA data transfer efficiency is enhanced to prevent the produced pattern image from becoming gloomy.

However, the just above-mentioned system has a serious disadvantage that the program processor unit is permitted to make use of the memory apparatus only during half of a memory cycle, which results in a reduced processing efficiency of the processor.

SUMMARY OF THE INVENTION

A primary object of the invention is to provide a computer system having a single memory apparatus commonly used by a central processor unit and an external processor unit in a time-shared manner, wherein the external processor unit is adapted to read out a predetermined bytes of data from the memory apparatus within each predetermined period of time, and wherein the frequency at which the use of memory apparatus by the central processor unit is interrupted is decreased thereby to enhance the data processing efficiency of the whole computer system.

Another object of the invention is to provide a computer system of the above type, wherein the central processor may make access to the memory apparatus with preference or priority and periodical data transfer from the memory apparatus to the external processor unit can be assured.

According to one feature of the invention, the central processor unit can make use of the single memory apparatus with preference or priority while the external processor unit is allowed to make access to the memory apparatus only when the central processor unit is not using the memory apparatus.

According to another feature of the invention, the number n of the data remaining to be read out among the data to be transferred in the number of N (n≦N), after a time $T_1$ elapsed from the beginning of a period of duration $T_o$ is successively compared with the number m of the data which can be continuously read out by the external processor unit during a remaining time span $(T_o-T_1)$. When the number n is smaller than the number m and when the central processor is not using the memory apparatus, data are read out from the memory apparatus by the external processor unit.

According to still another feature of the invention, when it is determined that the number n becomes equal to the number m as a result of the comparison, the central processor unit is inhibited from using the memory apparatus any further so that the external processor unit may read out continuously (i.e. without interruption) data from the memory apparatus.

DETAILED DESCRIPTION OF THE PREFERRED EMBODIMENT

Figure 1:
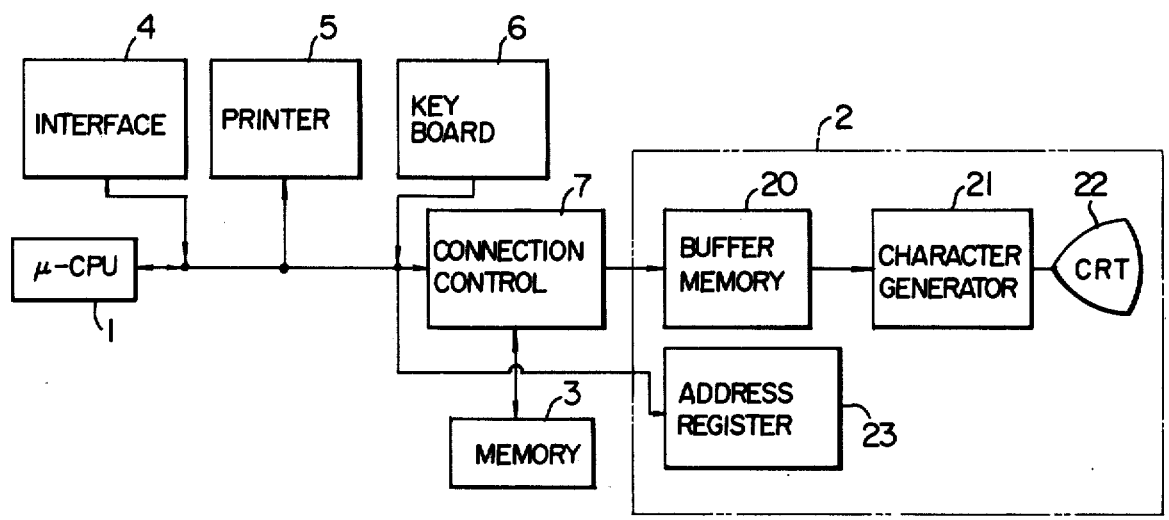
FIG. 1 shows in a block diagram a general arrangement of a computer system to which the teachings of the invention can be applied.

FIG. 1 shows schematically a general arrangement of a computer system to which the teaching of the present invention is applied. In the illustrated embodiment, a micro-processor ($\mu$ - CPU) 1 is employed as a central processor unit and a CRT (cathode ray tube) display apparatus 2 is used as an external processor unit. Reference numeral 3 denotes a storage or memory apparatus shared between the micro-processor 1 and the CRT display apparatus 2 for their common use. Determination as to whether the micro-processor 1 or the CRT display apparatus 2 is allowed to make use of the memory 3 is made by a connection control apparatus 7. The CRT display apparatus 2 includes a buffer memory 20, a character pattern generator 21, a CRT 22 and an address register 23 for designating the top address, as described in detail hereinafter. Reference numeral 4 denotes an interface adaptor for adapting various signals transferred between the micro-processor 1 and external apparatus compatible to one another. Numeral 5 denotes a printer and 6 denotes a key board.

The connection control apparatus 7 is arranged such that status information from the micro-processor 1 is handled with preference and the memory 3 is connected to the micro-processor 1 whenever the status information is present, as will be described in detail hereinafter. In the absence of the status information, the memory 3 will transfer the information or data stored therein to the CRT display apparatus 2 in accordance with control information from the CRT display apparatus 2. Such data transfer is performed under command of the address following the top address fed from the micro-processor 1 and stored in the address register 23.

As described hereinbefore, the time duration of a period for transferring the data from the memory 3 to the CRT display apparatus 2 is previously determined. During this transfer period, N data for one line (e.g. eighty bytes of data) are read out from the memory 3 in accordance with the top address stored in the address register 23 and displayed by the CRT 22.

Assuming that the transfer period has a time duration or span $T_o$, it does not always occur that the data transfer from the memory 3 is directed only to the CRT display apparatus 2 during this time span $T_o$, because the memory 3 is so controlled as to perform the data transfer while giving the micro-processor 1 preference in response to the access request from the latter.

For a satisfactory display of data in the CRT display apparatus 2, a predetermined number N of data, have to be transferred from the memory 3 to the CRT display apparatus 2 within the transfer period $T_o$ through the connection control apparatus 7. However, when the micro-processor 1 makes access to the memory 3 in the meantime, the data transfer to the CRT display apparatus 2 would then be interrupted due to the preference allotted to the micro-processor 1. Under such circumstances, the period $T_o$ required for transferring data to the CRT display apparatus 2 is necessarily reduced by a time interval during which the data transfer is performed with the micro-processor 1. As a result, data for one line may not be able to be supplied to the display apparatus 2 within the period $T_o$, thereby making impossible the proper data display on the CRT.

In order to prevent such an undesirable situation, the connection control apparatus 7 is adapted to store sequentially the number of data which have been transferred to the CRT display apparatus 2 in the course of the elapsing period within $T_o$ and to check if it is possible to transfer the remaining data to the CRT display apparatus 2 during the remaining time duration of the period $T_o$. Decision of possibility of such data transfer is made on the basis of the criterion of whether all the remaining number of data can be successively transferred to the CRT display apparatus 2 during the remaining time span.

As an example of this, it is assumed that the number $n_1$ of data has been transferred to the CRT display apparatus 2 from the memory 3 during an elapsed time span $T_1$ of the predetermined period $T_o$. Then, the number of data remaining to be transferred is given by $(N-n_1)$. Further, assuming that the time required for transferring one datum or one byte of information from the memory 3 to the CRT display apparatus 2 is represented by $\Delta T$, the period of time $t_1$ during which the remaining data $(N-n_1)$ can be successively transferred to the CRT display apparatus 2 is given by the following expression;

$$t_1 = (N - n_1)\Delta T \tag{1}$$

If the remaining time of the period $T_o$ is expressed by $T_l$, then $$T_l = T_o - T_1 \tag{2}$$

When comparison of $t_1$ with $T_l$ results in that $$t_1 < T_l \tag{3}$$

the memory 3 is allowed to be connected to the micro-processor 1 for data transfer therewith in response to the access from the micro-processor 1.

On the other hand, when the remaining time $T_l$ is reduced to be expressed by $$t_1 = T_l \tag{4}$$

the memory 3 will be connected again to the CRT display apparatus 2. After the completion of this connection, the memory 3 is exclusively used by the CRT display apparatus 2, whereby the remaining data can be successively supplied to the CRT display apparatus 2 from the memory 3. After the condition expressed by the equation (4) has been met, the micro-processor 1 is set to the standby state which continues until the next period $T_o$ begins.

The time $t_1$ which meets the equation (4) is inherently variable, since the time point as well as time duration at and during which the micro-processor 1 uses the memory 3 are arbitrarily determined by the micro-processor 1.

It will be appreciated that some transformations or modification may be made on the mathmatical expressions appearing in the above discussion. For example, comparison of $t_1$ with $T_l$ is equivalent to the comparison of $(N-n_1)$ with $T_l/\Delta T$, as can be derived from the expression (1), wherein $T_l/\Delta T$ in turn represents the number of data which can be successively fed to the CRT display apparatus 2 during the remaining time span $T_l$. Further, the term $(N-n_1)$ represents the number of data which have to be fed to the CRT display apparatus 2 during the remaining time span $T_l$. For the sake of convenience of description these terms $(N-n_1)$ and $T_l/\Delta T$ are represented as follows:

$$m = N - n_1 \quad (5)$$

$$n = T_l/\Delta T \quad (6)$$

wherein m represents obviously the number of data which can be successively fed to the CRT display apparatus 2 during the remaining time of period $T_l$ within $T_o$, while n represents the number of data remaining to be transferred after a time elapse $T_1$ from the beginning of the period $T_o$. In this manner, the comparisons described above can be excuted in terms of these numbers of data.

Figure 2:
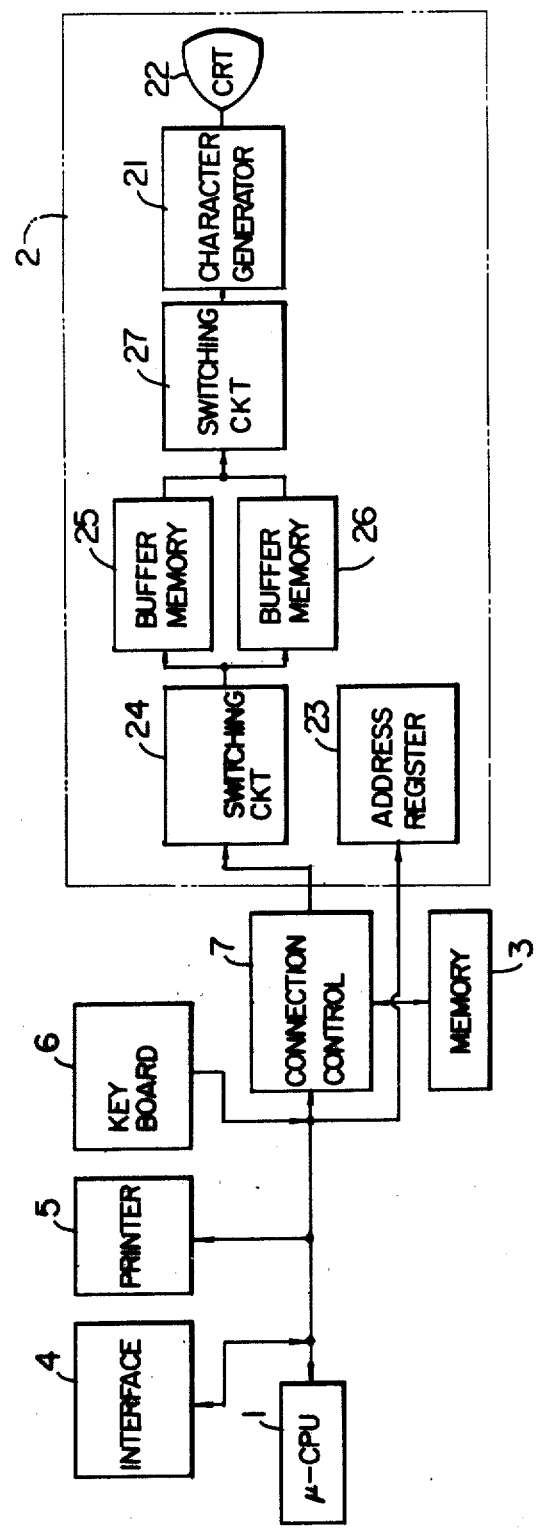
FIG. 2 is a similar view as FIG. 1 and shows another arrangement of a computer system.

In the above described embodiment, the CRT display apparatus 2 is provided with only a single buffer memory 20, which will lead undesirably to degradation in the data transmission efficiency (or through-put efficiency), as will become apparent from the following description with reference to FIG. 2.

A computer system shown in FIG. 2 is different from the one shown in FIG. 1 in that two buffer memories 25 and 26 are provided with switching circuits 24 and 27 connected at input and output sides thereof, respectively.

The connection control apparatus 7 serves to check the processing state of the micro-processor 1 and connect the memory 3 to the CRT display apparatus 2 to permit the data to be written in the buffer memory, only when the micro-processor 1 does not use the memory 3. During the display of one line of characters on the CRT 22, the data of one line of characters which are now being displayed are required to be stored in the buffer memory. Upon completion of the display of the data of one line, succeeding data for the next one line of characters must be immediately supplied to the character pattern generator 21. In this connection, it should be recalled that the CRT display apparatus 2 is permitted to make access to the memory 3 for reading out the data therefrom only when the memory 3 is not used by the micro-processor 1 and it takes a maximum period $T_o$ for one line display for the CRT display apparatus 2 to read out the data from the memory 3. In view of these situations, there are provided two buffer memories 25 and 26 in the system shown in FIG. 2. When one line of characters is being displayed on the CRT 22 in accordance with the data stored in the buffer memory 25, this buffer memory is connected to the character pattern generator 21 through the switching circuit 27. Meanwhile the other buffer memory 26 is connected to the memory 3 through the switching circuit 24 and the connection control apparatus 7 thereby to read out data from the memory 3. After elapse of the display period $T_o$ for one line of characters, the states of the switching circuits 24 and 27 are changed over to the respective other states to perform the data processing in a similar manner to the previous one.

When a pattern of one frame displayed on the CTR 22 is to be exchanged by another pattern, a top address for the data constituting the frame of the succeeding pattern is set at the address register 23 included in the CRT display apparatus 2 under command from the micro-processor 1. The CRT display apparatus 2 will then read out sequentially the data corresponding to a number of characters to be displayed as the pattern of one frame in accordance with the top address as well as associated addresses. When the data corresponding to the lowermost line of the pattern of the frame have been read out to be displayed, the same process is again repeated starting from the data corresponding to the beginning of the pattern of the frame thereby to maintain the display. In other words, the exchange of the pattern of one frame displayed on the CRT is carried out simply by setting corresponding data at the address register 23 from the micro-processor 1.

Figure 3:
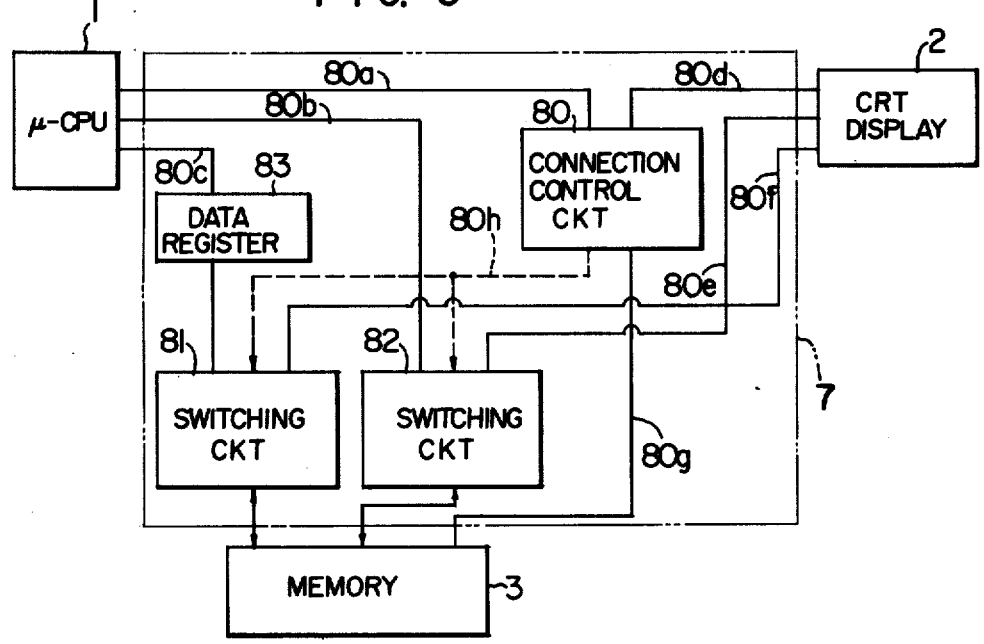
FIG. 3 is a block diagram showing an embodiment of a connection control apparatus constituting a main portion of a computer system according to the invention.

FIG. 3 shows an exemplary arrangement of the connection control apparatus 7 with associated circuits. As can be seen from this figure, the connection control apparatus 7 is composed of a connection control circuit 80, switching circuits 81 and 82 and a data register 83.

The connection control circuit 80 functions to connect the memory 3 and the micro-processor 1 by correspondingly controlling the switching circuits 81 and 82, when an access request of the micro-processor 1 to the memory 3 is detected through a control signal line 80a. Upon detection of the completion of processing in the micro-processor 1 through the signal line 80a, the connection control circuit 80 will then change over the states of the switching circuits 81 and 82 to connect the memory 3 to the CRT display apparatus 2, thereby to allow the data to be read out by the display apparatus 2 from the memory 3. As long as there are no access requests from the micro-processor 1, the memory 3 will remain in the state connected to the CRT display apparatus 2 and the latter can perform continuously the reading-out of data from the memory 3.

Figure 4:
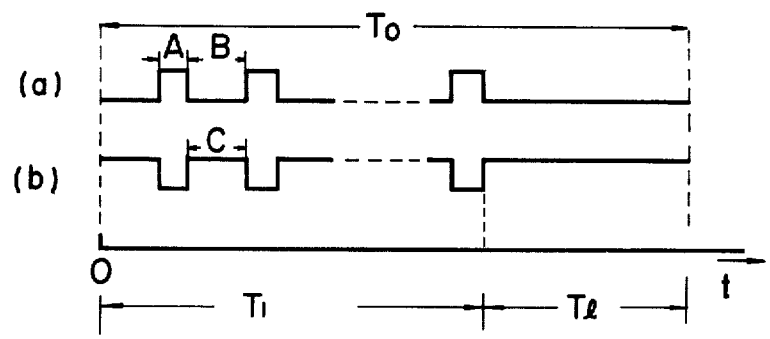
FIG. 4 is a time chart to illustrate operation of a system according to the invention.

The micro-processor 1 differs from an ordinary high speed processing unit in that the former can not perform data input/output processing simultaneously or in parallel with inherent data processing, but is adapted to be operated on the time-sharing basis, as graphically illustrated in FIG. 4. In this figure, a waveform (a) illustrates the data transfer between the micro-processor 1 and the memory 3 as well as the processing operation of the micro-processor 1. More particularly, the data transfer is carried out during each time interval A, while the data processing is excuted during each time interval B. In this manner, the micro-processor 1 excutes repeatedly and alternatively the intervals or cycles for exclusively using the memory 3 and the cycles for processing data obtained from the reading-out cycles. Waveform (b) illustrates how the data transfer is carried out between the CRT display apparatus 2 and the memory 3. The data transfer processing is excuted during a time span C. As will be understood from the comparison of the waveforms (a) and (b) in FIG. 4, the CRT display apparatus 2 is permitted to make access to the memory 3 for reading out the required data only when the memory 3 is not used by the micro-processor 1.

It will thus be appreciated that the micro-processor 1 can not perform continuously the data transfer with the memory 3, but excutes the data processing intermittently between the data input/output operations thereof. The connection control circuit 80 is adapted to connect the memory 3 to the CRT display apparatus 2 during the inherent data processing operation of the micro-processor 1, thereby to permit the data to be read out from the memory 3 into the display apparatus 2.

Referring again to FIG. 3, address and data lines 80b and 80c are provided between the connection control apparatus 7 and the micro-processor 1 in addition to the control signal line 80a. The address line 80b serves to feed addressing signals commanding the addresses in the memory 3, while the data line 80c serves to transmit the data to be written in the memory 3 or the data as read out from the latter. Control signals on the control signal line 80a contain various access signals (e.g. write-in command, read-out command and the like) in addition to the command for the memory 3 to be exclusively used by the micro-processor 1. The access signal to the memory 3 is available through the signal line 80g.

There are interposed a control signal line 80d, an address line 80e and a data line 80f between the CRT display apparatus 2 and the connection control apparatus 7. The control signal line 80d transmits a signal for accessing the memory 3 in addition to the signal representative of the memory being connected to the display apparatus 2. The address line 80e transfers the addresses of the memory 3, while the data line 80f transmits the data signals. The access of the CRT display apparatus 2 to the memory 3 is effected through the signal line 80g.

The switching circuit 81 is adapted to change over the data transfer from the memory 3 either to the micro-processor 1 or to the display unit 2 under the control of the connection control circuit 80, i.e. in dependence on a switching control signal fed through a control signal line 80h. On the other hand, the switching circuit 82 operates to change over the address signals either to the micro-processor or the CRT display unit under the control of the connection control circuit 80, i.e. in dependence on the switching control signal on the control signal line 80h. For the data transfer between the micro-processor 1 and the memory 3, the data are always once passed through the data register 83.

The connection control circuit 80 is further adapted to constantly track limits defining the time span during which the data are allowed to be written into the CRT display apparatus 2, as described hereinbefore with the aid of mathmatical expressions. In any event, whenever such limits are detected, the connection control circuit 80 controls the switching circuits 81 and 82 to establish the time interval during which the memory 3 can be exclusively used by the display apparatus 2.

Figure 5:
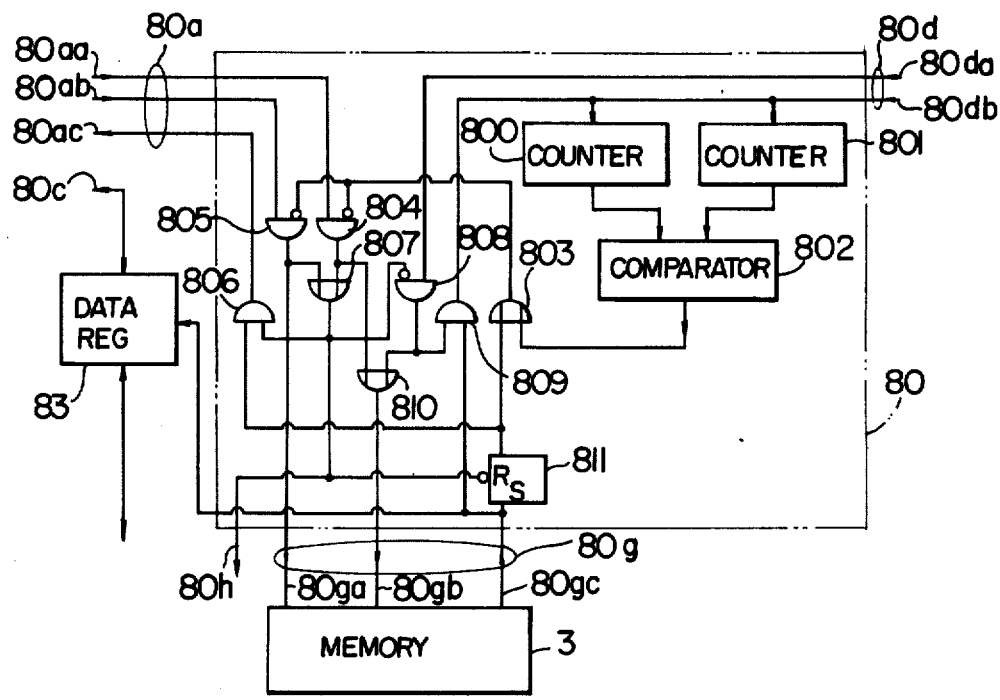
FIG. 5 shows in detail a circuit arrangement of the apparatus shown in FIG. 3.

FIG. 5 shows in a detailed circuit diagram an embodiment of the connection control circuit 80 with the associated circuitries. The connection control circuit 80 is composed of counters 800 and 801, a comparator circuit 802, OR-gates 803, 807 and 810, AND-gates 806 and 809, inhibit gates 804, 805 and 808, and a flip-flop circuit 811.

Signal lines 80aa, 80ab and 80ac correspond to the signal line 80a shown in FIG. 3 and are adapted to transmit a read-out command signal, a write-in command signal and a signal representative of the termination of processing (hereinafter referred to also as processing termination signal), respectively.

Signal lines 80da and 80db correspond to the signal line 80d shown in FIG. 3 and are adapted to transmit the read-out command signal and the processing termination signal, respectively.

Signal lines 80ga, 80gb and 80gc correspond to the signal line 80g shown in FIG. 3 and are destined to transmit the write-in command signal, the read-out signal and the processing termination signal, respectively.

In FIG. 5, arrows indicate directions of signal flows. Further, the same parts as those shown in FIG. 3 are denoted by the same reference numerals. The logic for the operation of the apparatus shown in FIG. 5 is not build up on the basis of the comparison in terms of time but the comparison of the numbers of data, as described hereinbefore.

When the signal on the read-out signal line 80aa (or write-in signal line 80ab) from the micro-processor 1 becomes high or logic "1," the switching circuits 81 and 82 (shown in FIG. 3 and not shown in FIG. 5) are changed over to the micro-processor 1 by the signal on the switching signal line 80h (shown in FIG. 3) through the gates 804 and 807 (or gates 805 and 807), while a processing command signal to the memory 3 is fed to the memory 3 by way of the signal line 80gb (or 80ga) through the gate 810. The data thus output from the memory 3 are loaded in the register 83 through the signal line 80gc and the flip-flop 811 is set also through the signal line 80gc. The output from the flip-flop 811 represents the processing termination signal for the micro-processor 1 and command the micro-processor 1, through the gate 806 and the line 80ac, to write-in data. When the write-in operation of the micro-processor 1 has been completed, the read-out command signal on the line 80aa is reset to logic "0." Then, the flip-flop 811 is reset through the gate 807, whereby the read-out operation of the micro-processor 1 is terminated. The register 83 is provided for compensating slow operation of the micro-processor 1. When the flip-flop 811 is set, the outputs from the gates 804 and 805 become logic "0's," with the result that the memory 3 is connected to the CRT display apparatus 2. Similar processes are performed for the write-in operation into the memory 3 from the micro-processor 1.

The data read-out operation by the CRT display apparatus 2 is excuted by accessing the memory 3 with the read-out command signal available from the signal line 80da through the gates 808 and 810. This process is, in principle, carried out continuously. As soon as the CRT display apparatus 2 has read the data of one byte, the next address datum is output. Thus, address data are successively output until the data have been completely writen into the CRT display apparatus 2 and the processing termination signal on the line 80db transmitted through the gate 809 is set to logic "1."

The counter 800 (remaining data counter) counts the remaining number n (defined hereinbefore) of data to be transferred within one period $T_o$, while the counter 801 (transfer enabling counter) is adapted to count the number m (defined hereinbefore) of data which can be continuously read out by the display apparatus 2 within a remaining time span of the predetermined period $T_o$. The contents in the counter 800 are decremented in response to the signal appearing or the processing termination signal line 80db and set to N which is the number of bytes of data to be transferred within one period $T_o$, at the transition between successive periods. The counter 801 is also set to N at the transition between the successive periods and the number N is decremented for every time elapse for transferring one byte of data, starting from the time point at which the remaining time within the period $T_o$ becomes equal to the time span within which N bytes of data can be continuously transferred. The comparator circuit 802 is adapted to compare the outputs from the counters 800 and 801 with each other and produces logic "0" when $n < m$ and logic "1" when $n = m$. The output "1" from the comparator circuit 802 enforceably resets the command or request signal from the micro-processor 1 to logic "0" through the gates 803, 804 and 805, thereby to change over the switching circuits 81 and 82 to connect the memory 3 with the CRT display apparatus 2. After the memory 3 has been connected to the display apparatus 2, the micro-processor 1 is inhibited from processing in connection with the memory 3, so that only the CRT display apparatus 2 can read out the data from the memory 3 continuously.

In the case of the illustrated embodiment, situations in which n is equal to m will rarely occur. Except for the cases where the micro-processor 1 executes continuously write-in or read-out operation to or from the memory 3 or where the ratio of $N/T_o$ in the CRT display apparatus 2 is remarkably great, the condition in which $n < m$ generally applies. For these reasons, the CRT display apparatus 2 can perform the data read-out operation from the memory 3 without essentially interfering with the processing operations of the micro-processor 1.

In this embodiment of the invention, arbitrarily selected locations in the memory 3 can be destined for locations to store pattern information by modifying correspondingly the values of addresses output from the CRT display apparatus 2 in accordance with the command by the micro-processor 1. Thus the exchange of the pattern frame can be instantly realized merely by changing the address, which enhances the processing capability of the CRT display apparatus. Further, since an inexpensive central processor having a low processing speed can be employed, the system costs can be significantly spaced.

In the embodiments described above, it assumed that a CRT display apparatus is used the processing apparatus. However, it will be readily appreciated that the invention can be applied to other similar types of external processing apparatus. Further, an external processing apparatus capable of writing data in the memory in addition to reading out the data therefrom can be equally employed.

As will be appreciated, according to the teachings of the invention, the data reading out operation by the external processing apparatus from a memory is allowed to be performed only when no data transfer takes place between the central processor unit and the memory. Thus, the interference to the operation of the central processor is inhibited and the processing efficiency of the whole computer system can be significantly enhanced.

We claim:

1. A computer system comprising a central processor unit, an external processor unit, a single memory apparatus which is shared between said central processor unit and said external processor unit for common use thereof, said external processor unit being adapted to read out a predetermined number of data for each predetermined period of time, and a connection control apparatus for connecting said memory apparatus to said central processor unit and said external processor unit selectively in a manner so that said central processor unit is allowed to use said memory apparatus with preference, while said external processor unit is allowed to read out data from said memory apparatus when said central processor unit is not using said memory apparatus, wherein said external processor unit is composed of a CRT display unit which reads out N bytes of data for display for each predetermined period of time $T_o$, and said connection control apparatus is adapted to successively compare the number n ($n < N$) of the data remaining to be transferred after a time span $T_1$ ($T_1 < T_o$) elapsed from the beginning of the period $T_o$ with the number m which is the number of bytes of data which can be continuously read out by said CRT display unit within the remaining time span ($T_o - T_1$), so that as long as the number n is smaller than the number m said CRT display unit is allowed to read out data only when said central processor unit is not using said memory apparatus, while upon the detection of the fact the number n is equal to the number m the use of said memory apparatus by said central processor unit is interrupted to thereby cause said CRT display unit to read out data from said memory continuously thereafter.

2. A computer system as set forth in claim 1, wherein said CRT display unit includes two buffer memories each adapted to store data for one line to be displayed, and wherein data is written in one of said buffer memories from said memory apparatus in a time span during which said CRT display unit performs display of data for one line on a cathode ray tube included in said CRT display unit in accordance with data previously stored in the other buffer memory, these operations of said two buffer memories being alternated with each other for every display of data for one line on said cathode ray tube.

3. A computer system as set forth in claim 2, wherein said CRT display unit includes an address register, the contents of which are set by said central processor unit, so that said CRT display unit is able to read out data from said memory means in accordance with said contents in said address register.

4. A computer system as set forth in claim 1, wherein said connection control apparatus includes a connection control circuit and two switching circuits, one of said switching circuits being for data and the other being for addresses, said connection control circuit being adapted to control said two switching circuits in a manner so that in response to an access request from said central processor unit to said memory apparatus said central processor unit is connected with said memory apparatus, and said switching circuits are changed over in response to the completion of processing by said central processor unit so as to allow connection between said memory apparatus and said external processor unit; and wherein said connection control circuit includes a first counter indicating the number of data n remaining to be processed for said each period, a second counter indicating the number of data m which can be continuously read out during a remaining time span $T_o - T_1$ of said each period $T_o$, a comparator circuit for comparing contents in said first and second counters with each other to detect coincidence therebetween, and logic gate means responsive to said comparator circuit to produce a switching command to the switching circuits only when said logic gate means receives an output from said comparator circuit indicating said coincidence, so as to enforceably interrupt connection between said central processor unit and said memory unit and to allow connection between said CRT display unit and said memory apparatus when said logic gate switching command is produced.

5. A computer system comprising a micro-processor, a CRT display unit, a memory apparatus for storing processing programs of said micro-processor and data for a pattern to be displayed by said CRT display unit, and a connection control apparatus for controlling connections of said memory apparatus relative to said micro-processor and said CRT display unit, wherein said connection control apparatus operates in a manner so that said memory apparatus is connected to said micro-processor in response to an access request therefrom and the connection is changed over to connect said memory apparatus to said CRT display unit in response to the completion of data processing in said microprocessor and that data transfer status between said memory apparatus and said CRT display unit for a predetermined period to interrupt unconditionally the connection between said memory apparatus and said micro-processor when the number of data remaining to be processed becomes equal to the number of data which can be continuously transferred to said CRT display unit within a remaining time span of said period, and to allow in turn connection between said memory apparatus and said CRT display unit, and wherein said CRT display unit includes two buffer memories each adapted to store data for one line to be displayed, said two buffer memories operate in a manner so that one of said buffer memories reads out data for one line to be displayed from said memory apparatus to store them therein in the time span during which one line data previously stored in the other buffer memory are displayed by said CRT display unit, the respective operations of said one and the other buffer memories being alternated with each other on a line-to-line basis.

* * * * *